United States Patent
Horiuchi et al.

(10) Patent No.: US 11,685,185 B2
(45) Date of Patent: Jun. 27, 2023

(54) THREE-DIMENSIONALLY SHAPED OBJECT FORMING SHEET, THREE-DIMENSIONALLY SHAPED OBJECT AND PRODUCTION METHOD FOR SAME, AND PRODUCTION METHOD FOR DECORATED THREE-DIMENSIONAL OBJECT

(71) Applicant: CASIO COMPUTER CO., LTD., Tokyo (JP)

(72) Inventors: Yuji Horiuchi, Higashiyamato (JP); Yoshimune Motoyanagi, Hamura (JP); Satoshi Mitsui, Tokyo (JP); Hideki Takahashi, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 43 days.

(21) Appl. No.: 17/141,826

(22) Filed: Jan. 5, 2021

(65) Prior Publication Data
US 2021/0197614 A1   Jul. 1, 2021

Related U.S. Application Data

(62) Division of application No. 15/993,801, filed on May 31, 2018, now Pat. No. 10,926,578.

(30) Foreign Application Priority Data

Jul. 27, 2017   (JP) .............................. JP2017-145878

(51) Int. Cl.
*B44C 1/17*   (2006.01)
*B32B 1/00*   (2006.01)
(Continued)

(52) U.S. Cl.
CPC ............ *B44C 1/1737* (2013.01); *B29C 44/02* (2013.01); *B32B 1/00* (2013.01); *B32B 7/02* (2013.01);
(Continued)

(58) Field of Classification Search
CPC ..... B44C 1/1737; B44C 5/0446; B29C 44/02; B29C 2795/002; B32B 1/00; B32B 7/02;
(Continued)

(56) References Cited

U.S. PATENT DOCUMENTS 4,871,408 A * 10/1989 Honma ................ G03G 15/221
428/209
5,122,430 A * 6/1992 Nishitsuji .............. G03G 9/097
430/108.6
(Continued)

FOREIGN PATENT DOCUMENTS

| CN | 1215665 A | 5/1999 |
|---|---|---|
| JP | S59-145148 A | 8/1984 |

(Continued)

OTHER PUBLICATIONS

JPH07246767—machine translation (Year: 1995).*
(Continued)

*Primary Examiner* — Francisco W Tschen
*Assistant Examiner* — Abhishek A Patwardhan
(74) *Attorney, Agent, or Firm* — Scully, Scott, Murphy & Presser, P.C.

(57) ABSTRACT

A three-dimensionally shaped object forming sheet includes: a thermally expansive layer distending at a predetermined temperature or higher; a base laminated on one side thereof with the thermally expansive layer; and a photothermal conversion layer for converting absorbed light to heat, formed on at least one side, wherein the base includes a first base and a second base that are laminated; and the first base
(Continued)

has an elasticity that is greater than an elasticity of the second base.

7 Claims, 8 Drawing Sheets

(51) Int. Cl.

| | |
|---|---|
| *B32B 27/08* | (2006.01) |
| *B32B 7/02* | (2019.01) |
| *B32B 27/24* | (2006.01) |
| *B32B 27/30* | (2006.01) |
| *B32B 7/06* | (2019.01) |
| *B32B 27/32* | (2006.01) |
| *B32B 27/10* | (2006.01) |
| *B32B 27/36* | (2006.01) |
| *B32B 27/40* | (2006.01) |
| *B32B 7/12* | (2006.01) |
| *B29C 44/02* | (2006.01) |
| *B41M 1/30* | (2006.01) |
| *B41M 7/00* | (2006.01) |
| *B29L 31/00* | (2006.01) |

(52) U.S. Cl.
CPC .............. *B32B 7/06* (2013.01); *B32B 7/12* (2013.01); *B32B 27/08* (2013.01); *B32B 27/10* (2013.01); *B32B 27/24* (2013.01); *B32B 27/304* (2013.01); *B32B 27/306* (2013.01); *B32B 27/32* (2013.01); *B32B 27/36* (2013.01); *B32B 27/40* (2013.01); *B41M 1/30* (2013.01); *B41M 7/0081* (2013.01); *B29C 2795/002* (2013.01); *B29L 2031/722* (2013.01); *B32B 2307/4023* (2013.01); *B32B 2307/51* (2013.01); *B32B 2405/00* (2013.01); *B32B 2451/00* (2013.01)

(58) Field of Classification Search
CPC .. B32B 7/06; B32B 7/12; B32B 27/08; B32B 27/10; B32B 27/24; B32B 27/304; B32B 27/306; B32B 27/32; B32B 27/36; B32B 27/40; B32B 2307/4023; B32B 2307/51; B32B 2405/00; B32B 2451/00; B41M 1/30; B41M 7/0081; B29L 2031/722; B44F 7/00; C09J 7/29; C09J 2301/122; C09J 2423/046; C09J 2423/106; C09J 2427/006; C09J 2429/006; C09J 2475/006
See application file for complete search history.

(56) References Cited

U.S. PATENT DOCUMENTS

| | | | |
|---|---|---|---|
| 5,554,490 A * | 9/1996 | Imaeda | B41J 2/325 |
| | | | 430/944 |
| 5,846,622 A * | 12/1998 | Imaeda | C09J 7/26 |
| | | | 428/317.1 |
| 2013/0161874 A1* | 6/2013 | Horiuchi | B29C 44/60 |
| | | | 264/415 |
| 2013/0280498 A1* | 10/2013 | Horiuchi | B32B 37/0076 |
| | | | 156/227 |

FOREIGN PATENT DOCUMENTS

| | | | |
|---|---|---|---|
| JP | S64-028660 A | | 1/1989 |
| JP | 07246767 A | * | 9/1995 |
| JP | H07-246767 A | | 9/1995 |
| JP | H10-129134 A | | 5/1998 |
| JP | H11-105351 A | | 4/1999 |
| JP | H11-138973 A | | 5/1999 |
| JP | 2002-067509 A | | 3/2002 |
| JP | 2004-205768 A | | 7/2004 |
| JP | 2004205768 A | * | 7/2004 |
| JP | 2005-279960 A | | 10/2005 |
| JP | 3954157 B2 | | 8/2007 |
| JP | 2010-047308 A | | 3/2010 |

OTHER PUBLICATIONS

JP2004205768A—machine translation (Year: 2004).*
Extended European Search Report dated Dec. 7, 2018 received in European Patent Application No. EP 18175278.3.
Notice of Reasons for Refusal dated Aug. 20, 2019 received in Japanese Patent Application No. JP 2017-145878 together with an English language translation.
Office Action dated Dec. 30, 2019 received in U.S. Appl. No. 15/993,801.
First Office Action dated May 27, 2020 received in Chinese Patent Application No. CN 201810544771.5 together with an English language translation.
Office Action dated Jun. 23, 2020 received in U.S. Appl. No. 15/993,801.
Notice of Allowance dated Oct. 6, 2020 received in U.S. Appl. No. 15/993,801.

* cited by examiner

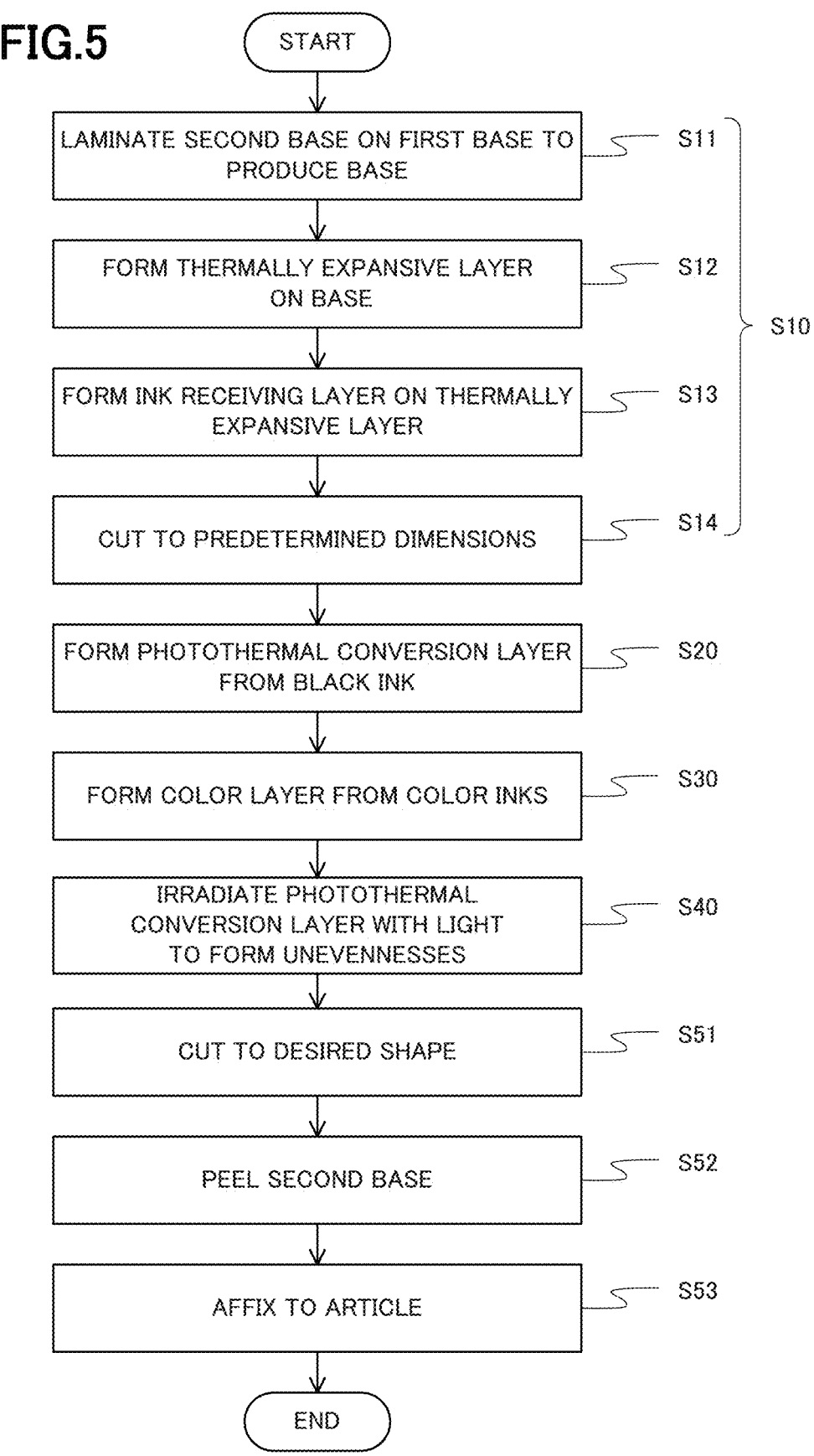

ically shaped objects formed from such thermally expandable sheets can be slightly deformed but cannot be greatly deformed. In particular, when three-dimensionally shaped objects formed from such thermally expandable sheets are deformed so as to have a concave surface, wrinkles are likely to form in the surface. Moreover, three-dimensionally shaped objects formed from such thermally expandable sheets cannot be deformed so as to have a three-dimensional curved surface (non-developable surface) such as a spherical surface. Accordingly, it is difficult to use this three-dimensionally shaped object as a substitute for a material having microscopic surface unevennesses, such as leather, to decorate the surface of an article that has a macroscopic undulating surface including a three-dimensional curved surface, such as furniture such as a chair.

THREE-DIMENSIONALLY SHAPED OBJECT FORMING SHEET, THREE-DIMENSIONALLY SHAPED OBJECT AND PRODUCTION METHOD FOR SAME, AND PRODUCTION METHOD FOR DECORATED THREE-DIMENSIONAL OBJECT

CROSS-REFERENCE TO RELATED APPLICATION

This application is a divisional of U.S. patent application Ser. No. 15/993,801, filed on May 31, 2018, which claims priority to Japanese Patent Application No. 2017-145878, filed on Jul. 27, 2017, the entire disclosure of which is incorporated by reference herein.

FIELD

This application relates generally to a three-dimensionally shaped object forming sheet that forms a three-dimensionally shaped object, a three-dimensionally shaped object and production method for the same, and a production method for a decorated three-dimensional object.

BACKGROUND

In the related art, a technique for forming a decorative sheet is known in which a pattern of a microcapsule-containing thermally expansive layer that distends due to heat is formed on a base, and the pattern of the thermally expansive layer is heated and caused to distend (see, for example, Japanese Patent No. 3954157). Additionally, a technique is known in which a thermally expandable sheet (also referred to as "thermally foamable sheet) provided on the entire surface of one side of a base is used to form a convex three-dimensionally shaped object in only a desired region of this one side. Specifically, first, the pattern of the region of the thermally expandable sheet to be made convex is printed on the surface on the thermally expansive layer side (hereinafter referred to as "front side") or on the surface on the base side (hereinafter referred to as "back side") of the thermally expandable sheet using a black ink having high light absorptivity. Next, the side on which the black ink was printed is irradiated with light such as near-infrared light, thereby causing the black ink to generate heat and the thermally expansive layer to distend to a thickness corresponding to the gradation of the black ink. Thus, a three-dimensionally shaped object can easily be formed. Moreover, three-dimensional images in which an image pattern and unevenness are combined can be formed by printing a desired colored image pattern on the front side of the thermally expandable sheet using cyan, magenta, and yellow colored inks having substantially no light absorptivity (see, for example, Unexamined Japanese Patent Application Kokai Publication No. H01-28660). Such a three-dimensional image includes unevennesses corresponding to the image pattern. Additionally, the unevennesses of the three-dimensional image can be emphasized depending on the gradation of the color of the image pattern.

The three-dimensionally shaped object described above can be used in informational media for the visually impaired such as touch maps, pictures in which image patterns and unevennesses are combined, advertising media that seeks to convey visual information more strongly, and the like. Moreover, use of three-dimensionally shaped objects is anticipated for samples that imitate sheet-like materials having patterns including unevennesses such as fabric, leather, and wood, and in decorative members such as decorative sheets (decoration sheets, decorative materials) as a substitute for these materials.

Thermally expandable sheets include a non-elastic base having a certain strength (for example, heavyweight paper) so as to ensure that wrinkles, undulations, and the like do not form when the thermally expansive layer distends and also ensure that the thermally expandable sheet will be transportable as a printing subject of a printer. Three-dimension- An objective of the present disclosure is to provide a production method for a decorated three-dimensional object in which a macroscopic undulating surface such as a curved surface-shaped portion of an article is covered with a three-dimensionally shaped object to provide a decoration of microscopic surface unevennesses, a three-dimensionally shaped object that can be easily deformed into a curved surface of a desired shape, a production method for the three-dimensionally shaped object, and a three-dimensionally shaped object forming sheet capable of forming the three-dimensionally shaped object.

SUMMARY

In order to solve the problems described above, a three-dimensionally shaped object forming sheet according to the present disclosure includes:
  a thermally expansive layer distending at a predetermined temperature or higher; and
  a base laminated on one side thereof with the thermally expansive layer,
  wherein
  on at least one side of the three-dimensionally shaped object forming sheet a photothermal conversion layer for converting absorbed light to heat is formed,
  the base comprises a first base and a second base that are laminated; and
  the first base has an elasticity that is greater than an elasticity of the second base.

A three-dimensionally shaped object according to the present disclosure includes:
  a thermally expansive layer distending at a predetermined temperature or higher; and
  a base laminated on one side thereof with the thermally expansive layer; wherein
  unevennesses are formed in a surface on one side of the thermally expansive layer by differences in a distension amount of the thermally expansive layer;
  the base comprises a first base and a second base that are laminated; and
  the first base has an elasticity that is greater than an elasticity of the second base.

A production method for the three-dimensionally shaped object according to the present disclosure includes:
- a step of providing an electromagnetic wave heat conversion layer on at least one side of a sheet in which a thermally expansive layer is provided on a base; and
- an unevenness forming step of forming unevennesses on a surface of the sheet by causing the thermally expansive layer of a region corresponding to the electromagnetic wave heat conversion layer to distend by irradiating the electromagnetic wave heat conversion layer with electromagnetic waves of a predetermined wavelength, wherein
- the base comprises at least two layers; and
- the two layers of the at least two layers have elasticities different from each other.

Another production method for the three-dimensionally shaped object according to the present disclosure is a production method for a three-dimensionally shaped object having unevennesses in a surface, the method including sequentially performing:
- a base laminating step of producing a base by laminating together a second base and a first base having greater elasticity than an elasticity of the second base;
- a thermally expansive layer forming step of forming, on one side of the base, a thermally expansive layer that distends at a predetermined temperature or higher on;
- a photothermal conversion layer printing step of forming a photothermal conversion layer for converting absorbed light to heat and releasing the heat, on at least one surface of a side of the base and a side of the thermally expansive layer; and
- a light irradiation step of irradiating light so as to reach the photothermal conversion layer thereby causing the thermally expansive layer in a region where the photothermal conversion layer is formed to distend.

A production method for a decorated three-dimensional object according to the present disclosure is a production method for a decorated three-dimensional object having unevennesses in at least a portion of a surface, the method including sequentially performing:
- a base laminating step for producing a base by laminating a second base and a first base having higher elasticity than an elasticity of the second base;
- a thermally expansive layer forming step of forming, on one side of the base, a thermally expansive layer that distends at a predetermined temperature or higher;
- a photothermal conversion layer printing step of forming a photothermal conversion layer for converting absorbed light to heat and releasing the heat, on at least one surface of a side of the base and a side of the thermally expansive layer; and
- a light irradiation step of irradiating light so as to reach the photothermal conversion layer thereby causing the thermally expansive layer in a region where the photothermal conversion layer is formed to distend; and
- an affixing step of affixing another side of the base to a surface of an article.

Another production method for a decorated three-dimensional object according to the present disclosure includes:
- a step of affixing a sheet-like decorative member, having on one side therein unevennesses, on a surface of an article having an undulating surface more macroscopic than the unevennesses; wherein
- in the decorative member, at least an affixing side has elasticity, and the unevennesses that become a decoration are formed by an electromagnetic wave heat conversion layer laminated on a thermally expansive layer being irradiated with electromagnetic waves of a predetermined wavelength.

With the three-dimensionally shaped object forming sheet according to the present disclosure, it is possible to form a three-dimensionally shaped object that can be deformed into a desired curved surface. With the three-dimensionally shaped object according to the present disclosure, it is possible to decorate the surface of a desired article. With the production method for the three-dimensionally shaped object according to the present disclosure, it is possible to manufacture the three-dimensionally shaped object with good productivity. With the production method for the decorated three-dimensional object according to the present disclosure, it is possible to manufacture the decorated three-dimensional object with good productivity.

BRIEF DESCRIPTION OF THE DRAWINGS

A more complete understanding of this application can be obtained when the following detailed description is considered in conjunction with the following drawings, in which:

FIG. 5 is a flowchart illustrating the flow of a production method for the three-dimensionally shaped object and the decorated three-dimensional object according to the present disclosure;

DETAILED DESCRIPTION

Figure 1:
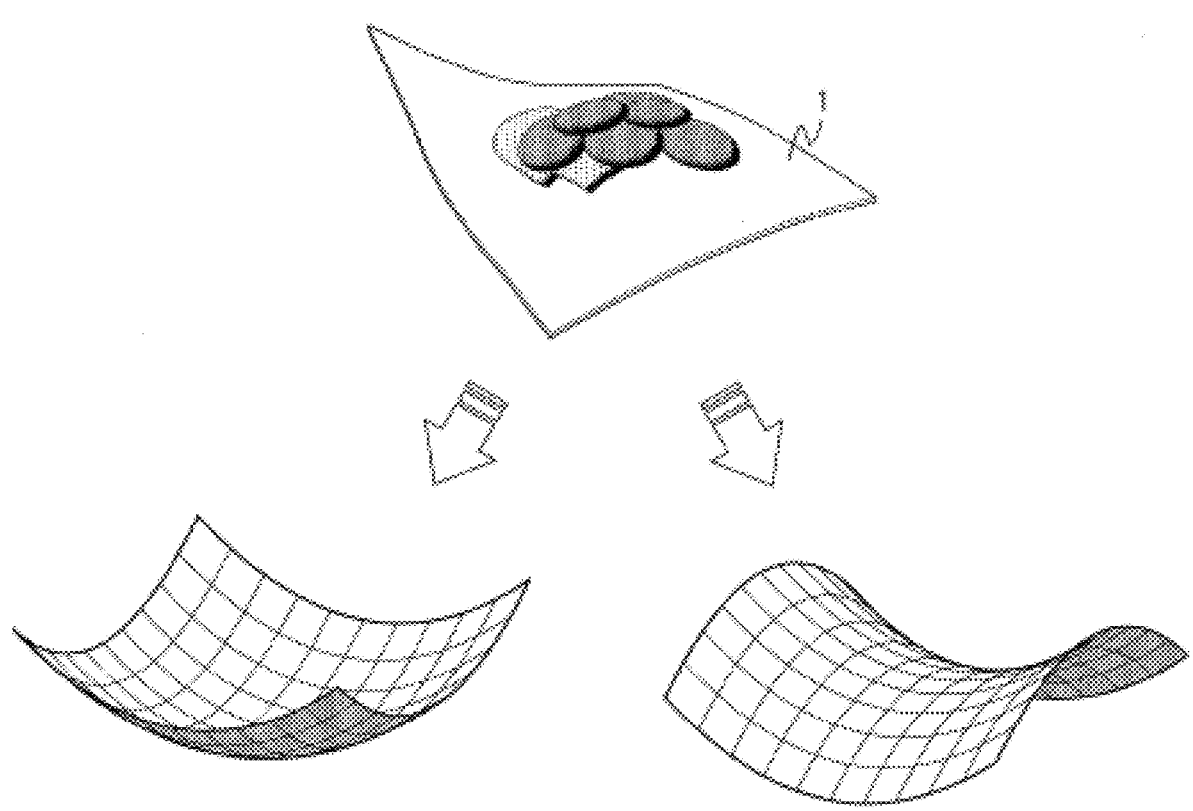
FIG. 1 is an appearance view of a three-dimensionally shaped object according to the present disclosure.

Hereinafter, embodiments of the present disclosure are described in detail while referencing the drawings. In the following embodiments, a three-dimensionally shaped object is described as an embodiment of the technical idea of the present disclosure, but the present disclosure is not limited thereto. To elucidate the description, some of the sizes, positional relationships, and the like of the constituents illustrated in the drawings have been exaggerated and some of the shapes have been simplified. In addition, in the following description, constituents and steps that are identical or substantially identical are assigned the same reference numerals and descriptions are appropriately foregone.

Embodiment 1: Three-Dimensionally Shaped Object

Figure 2A:
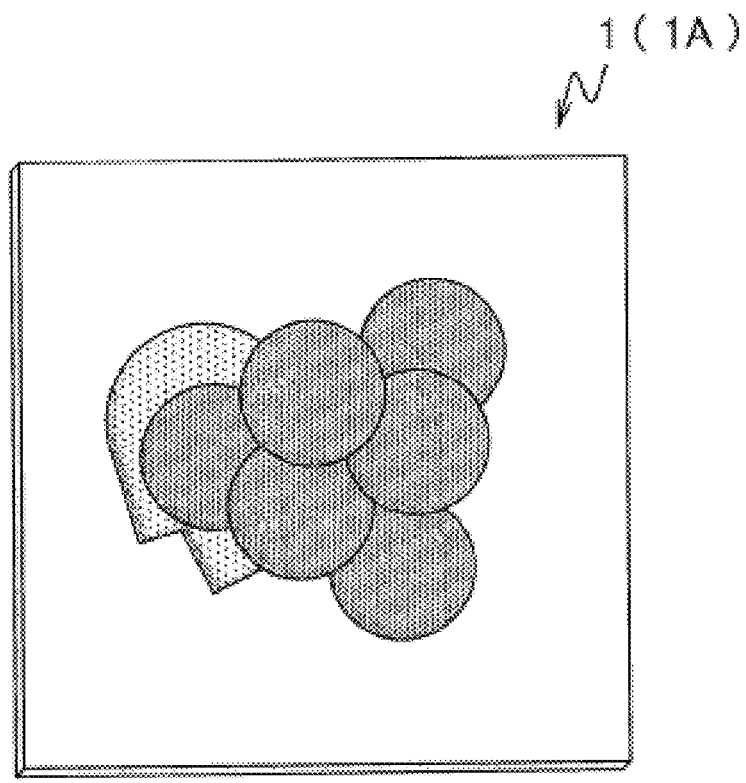
FIG. 2A is a plan view schematically illustrating the configuration of the three-dimensionally shaped object according to the present disclosure.
Figure 2B:
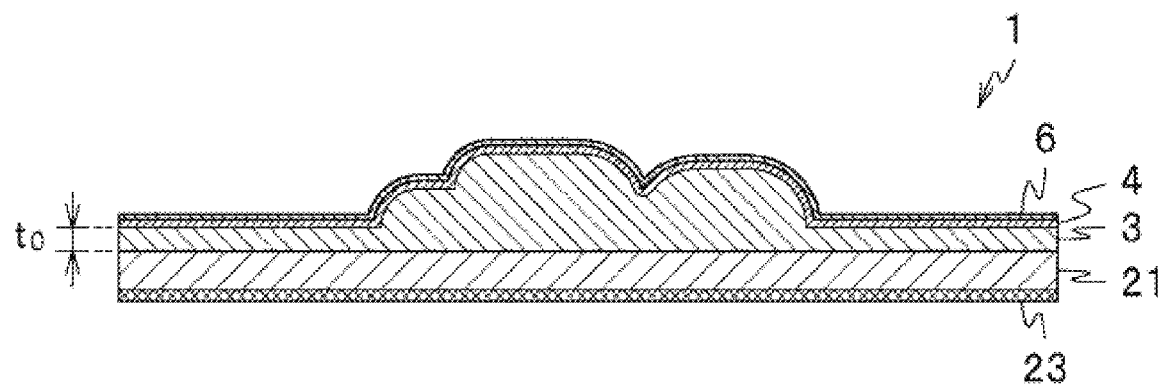
FIG. 2B is a cross-sectional view schematically illustrating the configuration of the three-dimensionally shaped object according to Embodiment 1 of the present disclosure.
Figure 2C:
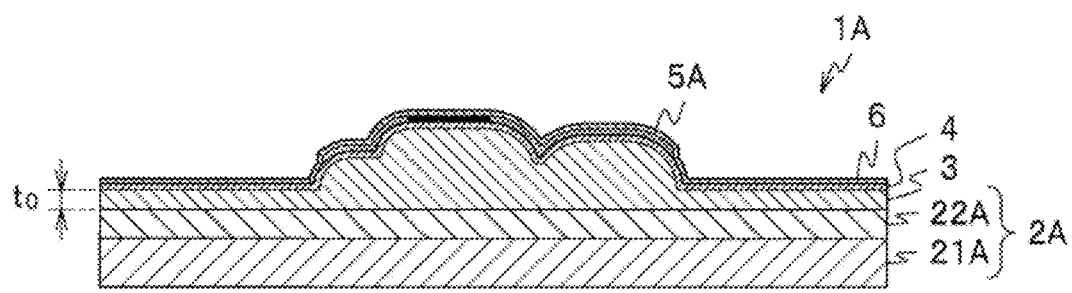
FIG. 2C is a cross-sectional view schematically illustrating the configuration of a three-dimensionally shaped object according to Embodiment 2 of the present disclosure.
Figure 3A:
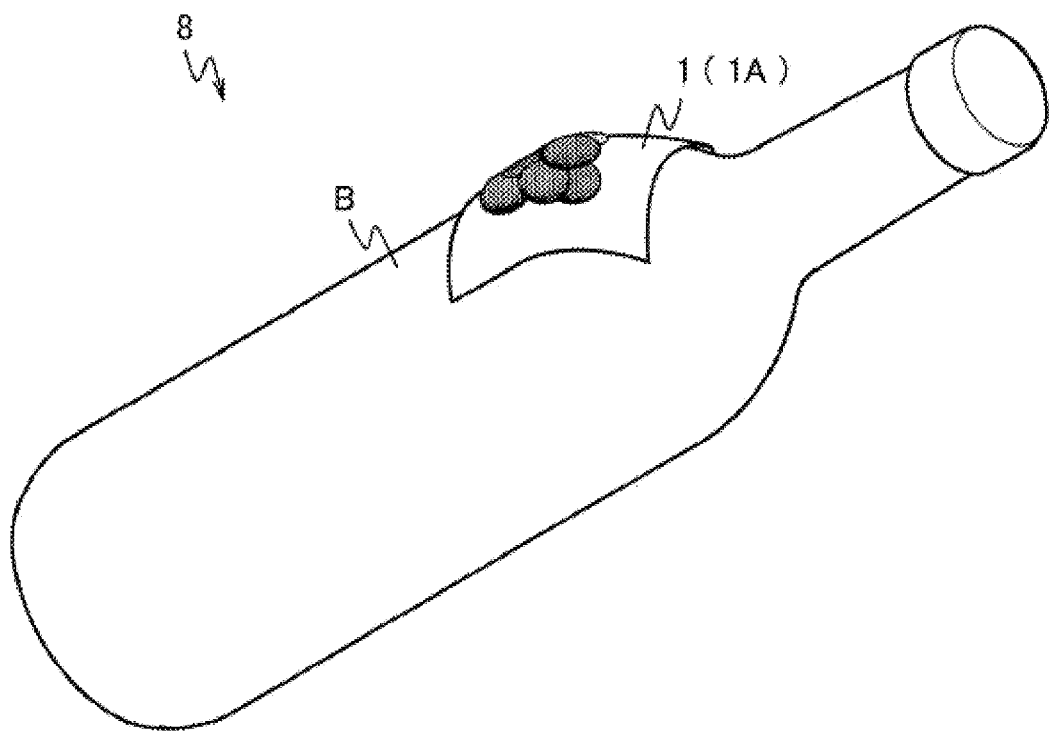
FIG. 3A is an appearance view explaining a decorated three-dimensional object according to the present disclosure.
Figure 3B:
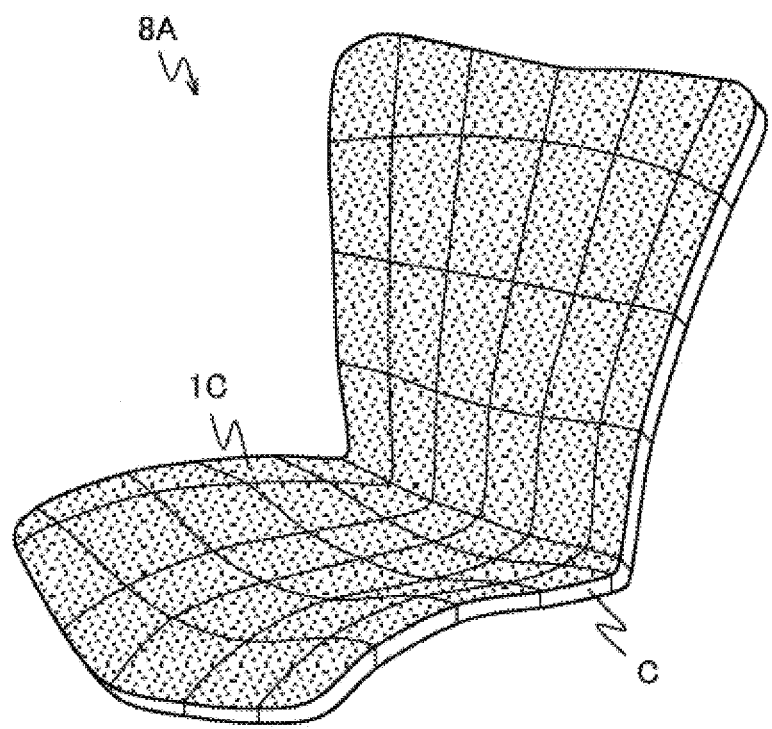
FIG. 3B is an appearance view explaining a decorated three-dimensional object according to the present disclosure.

The configuration of a three-dimensionally shaped object 1 according to Embodiment 1 of the present disclosure is described while referencing FIG. 1 to FIG. 3B. FIG. 1 is an appearance view of the three-dimensionally shaped object 1. FIG. 2A is a plan view schematically illustrating the configuration of the three-dimensionally shaped object 1. FIG. 2B is a cross-sectional view schematically illustrating the configuration of the three-dimensionally shaped object 1. FIGS. 3A and 3B are drawings explaining use examples of the three-dimensionally shaped object 1, and are appearance view of decorated three-dimensional objects 8 and 8A. In this application, "three-dimensionally shaped object" means a sheet-like printed object having unevennesses on the surface of one side due to being thicker in some portions than others. Particularly, a three-dimensionally shaped object that has color on the surface of a side that has unevennesses is appropriately referred to as "2.5D image." Moreover, in this application, unless otherwise noted, "top" and "bottom" in FIG. 2B and the other cross-sectional drawings describe the same "top" and "bottom."

As illustrated in FIG. 1, a 2.5D image (the three-dimensionally shaped object) 1 according to Embodiment 1 of the present disclosure is a sheet-like flexible member in which an image and unevennesses accompanying the image are formed on one surface. In the following, the surface of the 2.5D image 1 on which the unevennesses or the uneven-nesses and the image is formed is referred to as the "front side" of the 2.5D image 1, and the surface of the side opposite the front side of the 2.5D image 1 is referred to as the "back side" of the 2.5D image 1. In the present embodiment, as illustrated in FIG. 2A and FIG. 2B, a design of grapes is drawn in the 2.5D image 1. In this design, the globes of the bunch of grapes are raised high (the thickness is great), the leaves of the bunch of grapes are raised lower than the globes of the bunch of grapes, and the background is the lowest and flat. The overall shape of the 2.5D image 1 is square, but the shape, the size, and the like of the 2.5D image 1 is appropriately selected depending on purpose. Furthermore, the 2.5D image 1 has elasticity and, as illustrated in FIG. 1, deforms into three-dimensional curved shapes such as spherical surfaces and hyperbolic paraboloidal surfaces. For example, the 2.5D image 1 can be affixed to an article B having a three-dimensional curved surface such as that illustrated in FIG. 3A to produce a decorated three-dimensional object 8. The 2.5D image 1 can be affixed to the surface of an article of any shape without slack, tears, or the like (details are given later in the description of the production method). Examples of the article include household items such as furniture, containers such as beverage bottles, and packaging materials, but are not limited thereto.

As illustrated in FIG. 2B, the 2.5D image 1 according to the present embodiment includes a first base 21, a thermally expansive layer 3 provided on the first base 21 and having unevennesses in the top surface, an ink receiving layer 4 provided with substantially uniform thickness on the entire surface of the thermally expansive layer 3, and a color layer 6 that is formed on a surface of the ink receiving layer 4, namely the front side of the 2.5D image 1, to form an image. In the following, the surface of the first base 21 on which the thermally expansive layer 3 is provided is referred to as the "front side" of the first base 21, and the surface of the side opposite the front side of the first base 21 is referred to as the "back side" of the first base 21. The surface of the thermally expansive layer 3 on which the ink receiving layer 4 is provided (also, in the 2.5D image 1, the top surface having the unevennesses) is referred to as the "front side" of the thermally expansive layer 3, and the surface of the side opposite the front side of the thermally expansive layer 3 is referred to as the "back side" of the thermally expansive layer 3. The surface of the ink receiving layer 4 on the thermally expansive layer 3 side is referred to as the "back side" of the ink receiving layer 4, and the surface of the side opposite the back side of the ink receiving layer 4 is referred to as the "front side" of the ink receiving layer 4. The 2.5D image 1 includes an adhesive layer 23 on the entire back side, that is, on the entire back side of the first base 21. The 2.5D image 1 is produced using a three-dimensionally shaped object forming sheet 10 illustrated in FIG. 4. Note that the unevennesses of the 2.5D image 1 can also be expressed by being formed in the surface of the thermally expansive layer 3 side of the 2.5D image 1. The three-dimensionally shaped object forming sheet 10 is also referred to as a "thermally expandable sheet 10."

Embodiment 1: Thermally Expandable Sheet

Figure 4:
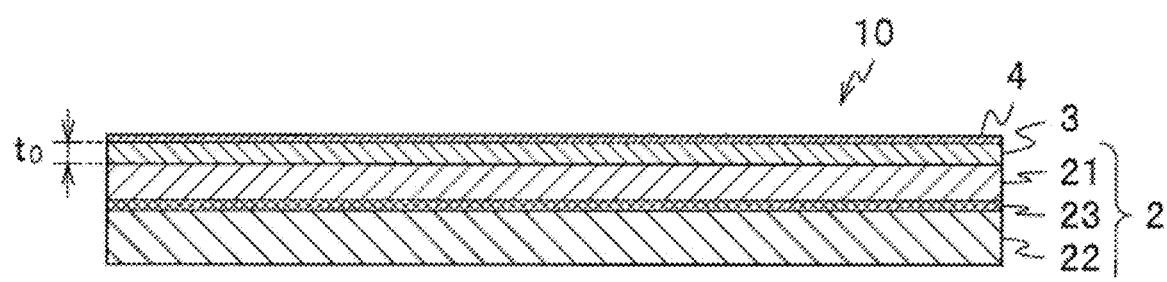
FIG. 4 is a cross-sectional view schematically illustrating the configuration of a three-dimensionally shaped object forming sheet according to Embodiment 1 of the present disclosure.

The configuration of the thermally expandable sheet 10 used in the formation of the 2.5D image 1 is described below while referencing FIG. 4. FIG. 4 is a cross-sectional view schematically illustrating the configuration of the three-dimensionally shaped object forming sheet (the thermally expandable sheet) 10 according to Embodiment 1 of the present disclosure. As illustrated in FIG. 4, the thermally expandable sheet 10 according to the present embodiment includes a base 2 obtained by laminating a second base 22 on the first base 21, the thermally expansive layer 3 provided having a uniform thickness on the entire surface of the first base 21 side of the base 2, and the ink receiving layer 4 provided having a uniform thickness on the entire surface of the thermally expansive layer 3. In the following, the top surface of the thermally expandable sheet 10 is referred to as the "front side" of the thermally expandable sheet 10, and the surface of the side opposite the front side of the thermally expandable sheet 10 is referred to as the "back side" (or the "bottom surface") of the thermally expandable sheet 10. The front sides and the back sides of the first base 21, the thermally expansive layer 3, and the ink receiving layer 4 are the same as described for the 2.5D image 1. Note that, in some cases, the front side of the first base 21 is referred to as the front side of the base 2. The base 2 includes the adhesive layer 23 between the first base 21 and the second base 22. The thermally expandable sheet 10 is an object to be printed (or object to be processed) in which color inks that form the color layer 6 are printed on the front side (top surface) and black ink that forms a photothermal conversion layer 5 (see FIG. 6C) is printed on the back side (bottom surface). It is sufficient that the dimensions of the thermally expandable sheet 10 are greater than or equal to the dimensions of the 2.5D image 1. Moreover, the dimensions of the thermally expandable sheet 10 correspond to the printer used to form the photothermal conversion layer 5 and the color layer 6. For example, the thermally expandable sheet 10 is an A3 paper size.

Base

The base 2 supports the soft thermally expansive layer 3. The base 2 imparts enough strength (rigidity) for the thermally expandable sheet 10 to function as an object to be printed. The base 2 has strength sufficient to prevent wrinkles, undulations, and the like from forming in the thermally expandable sheet 10 when the thermally expansive layer 3 distends in part. Furthermore, the base 2 has flexibility and heat resistance corresponding to the transport mechanism of the coating device, the printer, and the like used when forming the thermally expansive layer 3. In this application, the term "heat resistance" refers to resistance to the heat applied to the constituents of the thermally expandable sheet 10 and the 2.5D image 1 during the production of the thermally expandable sheet 10 and the 2.5D image 1, and particularly to resistance to the heat that causes the thermally expansive layer 3 to distend. The base 2 has a laminated structure obtained by laminating the second base 22 on the first base 21, on which the thermally expansive layer 3 is provided. Furthermore, the base 2 includes the adhesive layer 23 between the first base 21 and the second base 22. As such, with the base 2, the first base 21 and the second base 22 can be peeled from each other. In the following, the surface of the second base 22 on the first base 21 side is referred to as the "front side" of the second base 22, and the surface of the side opposite the front side of the second base 22 is referred to as the "back side" of the second base 22. Note that, in some cases, the back side of the second base 22 is referred to as the back side of the base 2. The first base 21, the second base 22, and the adhesive layer 23 individually have heat resistance. It is sufficient that the first base 21, the second base 22, and the adhesive layer 23 have the strength described above while laminated (that is, while configured as the base 2). Moreover, as described later, the photothermal conversion layer 5, which releases heat that causes the thermally expansive layer 3 to distend, is printed on the back side of the thermally expandable sheet 10 (that is, on the back side of the second base 22). Accordingly, it is preferable that the thickness of the base 2 be small while maintaining strength so as to facilitate the propagation of the heat released by the photothermal conversion layer 5 to the thermally expansive layer 3. Additionally, it is preferable that the first base 21, the second base 22, and the adhesive layer 23 individually have high thermal conductivity.

The elasticity of the first base 21, on which the thermally expansive layer 3 is provided, is greater than the elasticity of the second base 22. In the 2.5D image 1, the first base 21 can stretch together with the thermally expansive layer 3 due to external forces while reinforcing the soft thermally expansive layer 3. Accordingly, it is preferable that the coefficient of extension of the first base 21 is substantially equivalent to the coefficient of extension of the thermally expansive layer 3 prior to thermal expansion, or is lower than the coefficient of expansion of the thermally expansive layer 3 prior to thermal expansion. Moreover, it is preferable that the coefficient of extension of the first base 21 is greater than or equal to the coefficient of extension of the region in the 2.5D image 1 where the coefficient of extension is lowest (the region where the thickness is greatest). Furthermore, it is preferable that the first base 21 can stretch and contract together with the thermally expansive layer 3 in the 2.5D image 1. As a result of the first base 21 stretching and contracting, not only does the 2.5D image 1 stretch due to external forces, but also contracts to return to the shape prior to stretching. As such, it is easier to affix the 2.5D image 1 to an article. Moreover, the 2.5D image 1 can be affixed to an article having cushioning properties such as the seat of a chair. It is preferable that the first base 21 has durability greater than or equal to that of the thermally expansive layer 3. Furthermore, depending on the use of the 2.5D image 1, it is preferable that the first base 21 has water resistance. The front side of the first base 21 has high adhesiveness to the thermally expansive layer 3, and the back side of the first base 21 has high adhesiveness to the adhesive layer 23. In one example, the first base 21 is a resin film and is formed from a resin selected from polyethylene, polypropylene, polyvinyl alcohol, polyvinyl chloride, and polyurethane resins, copolymers thereof, and the like. The first base 21 is formed having a thickness whereby the required strength, the required coefficient of extension, and the like can be obtained.

The second base 22 is a member that primarily ensures the strength (rigidity) of the base 2. The second base 22 suppresses the elasticity of the base 2 and the thermally expandable sheet 10 and maintains the shape of the thermally expandable sheet 10 when the thermally expandable sheet 10 is transported by the transport mechanisms (transport rollers, for example) of the printer, the light irradiation device, and the like. Accordingly, it is preferable that the second base 22 be substantially non-elastic. Moreover, it is preferable that the second base 22 is formed from a material that allows ink to be printed on the back side. In cases where it is difficult to print ink on the back side of the second base 22, an ink receiving layer (not illustrated in the drawings) similar to the ink receiving layer 4 (described later) is provided on the back side of the second base 22. While configured as the thermally expandable sheet 10, the second base 22 is laminated on the first base 21 with the adhesive layer 23 disposed therebetween, but the second base 22 is removed when producing the 2.5D image 1. The adhesive layer 23 remains on the back side of the 2.5D image 1 (see FIG. 2B). Accordingly, the front side of the second base 22 peels from the adhesive layer 23 easier than the back side of the first base 21. Specifically, as the second base 22, it is possible to use a non-elastic resin film or the like made from high-quality paper that has been subjected to silicone resin processing, kraft paper that has been subjected to silicone resin processing, polyethylene terephthalate (PET), or the like.

In the base 2, the adhesive layer 23 functions as an adhesive that bonds the first base 21 to the second base 22. The adhesive layer 23 also functions as an adhesive that bonds the 2.5D image 1 to the article. Accordingly, it is preferable that the adhesive layer 23 is formed from a known adhesive that has characteristics such as adhesive strength and water resistance that correspond to the first base 21, the article, and the uses thereof. Furthermore, it is preferable that the adhesive layer 23 has strong adhesiveness that prevents the first base 21 from peeling from the second base 22 due to the first base 21 conforming to the thermally expansive layer 3 and trying to deform when the thermally expansive layer 3 distends in part. Additionally, it is preferable that the adhesive layer 23 has sufficient heat resistance.

Note that tack paper can be used as the base 2 that includes the first base 21, the second base 22, and the adhesive layer 23. Tack paper is commercially available and is used for seals that can be stretched by peeling off the release paper.

Thermally Expansive Layer

The thermally expansive layer 3 forms unevennesses on the front side of the 2.5D image 1 by distending in part. For example, the thermally expansive layer 3 is a film that is used in known thermally expandable sheets that contains thermally expandable microcapsules and a thermoplastic resin as a binder. The thermally expansive layer 3 is formed having a uniform thickness $t_0$ on the base 2. The thermally expandable microcapsules are formed from a thermoplastic resin and contain a volatile solvent. While dependent on the type of the thermoplastic resin and the type of the volatile solvent, the volatile solvent vaporizes when the thermally expandable microcapsules are heated to about 80° C. or higher and, as a result, distend to a size in accordance with the heating temperature and the heating time. Therefore, the distension of the thermally expandable microcapsules is limited to the region of the thermally expandable sheet 10 where the thermally expansive layer 3 was heated. As a result, the front side of the thermally expansive layer 3, which is not fixed to the base 2, rises, and unevennesses are formed in the front side of the thermally expansive layer 3, which is not fixed. This partial heating of the thermally expansive layer 3 is performed by the photothermal conversion layer 5 (see FIG. 6C), which is made from black ink and is formed on the back side of the thermally expandable sheet 10, converting light and releasing heat. Moreover, as described in the modified examples later, the partial heating of may be performed by a photothermal conversion layer 5A (see FIG. 2C), which is made from black ink and is formed on the front side of a thermally expandable sheet 10A, converting light and releasing heat. The thermally expansive layer 3 may contain a white pigment such as titanium oxide. By including a white pigment in the thermally expansive layer 3, the base color of the thermally expansive layer 3 can be made white so that the color layer 6 formed on the front side of the thermally expansive layer 3 will exhibit a clear appearance. Depending on the appearance of the 2.5D image 1, the thermally expansive layer 3 may be colored to a desired color by a (carbon black-free) pigment other than black. Furthermore, depending on the use of the 2.5D image 1, the thermally expansive layer 3 has water resistance.

The thermally expansive layer 3 distends, for example, to a thickness that is, at maximum, about 10-times the thickness prior to distending. The thickness $t_0$ of the thermally expandable sheet 10 prior to distending, that is, the thickness $t_0$ in the region (the background or the like of the design) that does not distend is set in accordance with the desired height of the highest convexity. The thermally expansive layer 3 has elasticity prior to distending. Moreover, the thermally expansive layer 3 has elasticity in at least the thickness $t_0$ portion after distending as the 2.5D image 1. Note that in the distended thermally expansive layer 3, elasticity tends to be lower in the regions that are thicker than the thickness $t_0$, that is, in the regions where the amount of distension is greater.

Ink Receiving Layer

The thermally expansive layer 3 generally is hydrophobic, and ink does not readily adhere thereto. As such, the ink receiving layer 4 is provided to cause the ink of the color layer 6 to adhere. The ink receiving layer 4 includes porous silica or alumina that absorbs ink into gaps, a super absorbent polymer that swells to absorb ink, or the like, and is formed having a thickness of 10 to tens of μm depending on the material. Moreover, a receiving layer used in typical inkjet printer printing paper can be used as the ink receiving layer 4.

Photothermal Conversion Layer

Figure 6A:
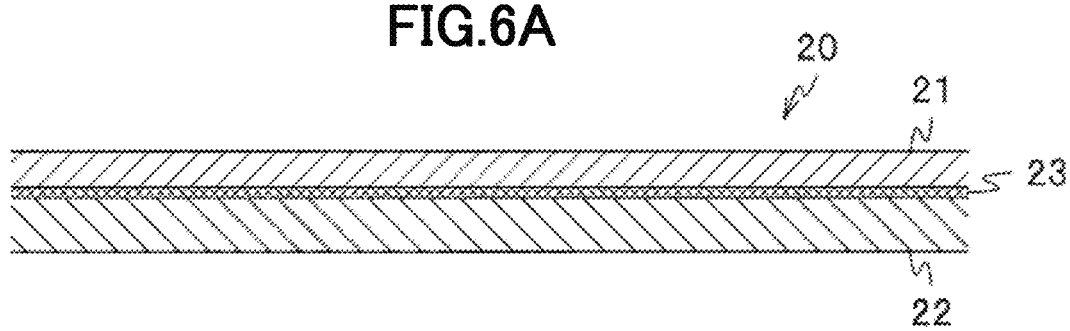
FIG. 6A is a schematic view (cross-sectional view) for explaining a base laminating step in the production method for the three-dimensionally shaped object according to Embodiment 1 of the present disclosure.
Figure 6B:
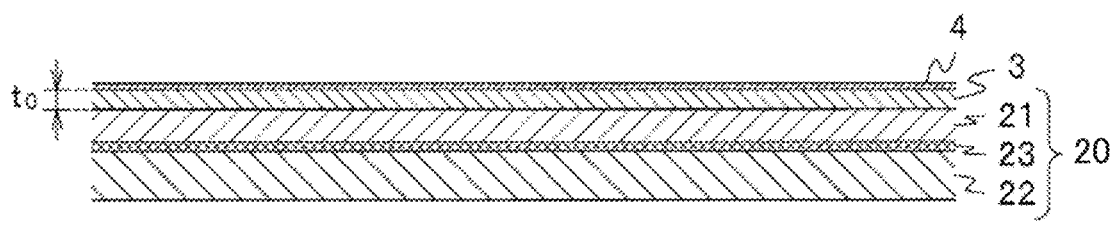
FIG. 6B is a schematic view (cross-sectional view) for explaining a thermally expansive layer forming step and an ink receiving layer forming step in the production method for the three-dimensionally shaped object according to Embodiment 1 of the present disclosure.
Figure 6C:
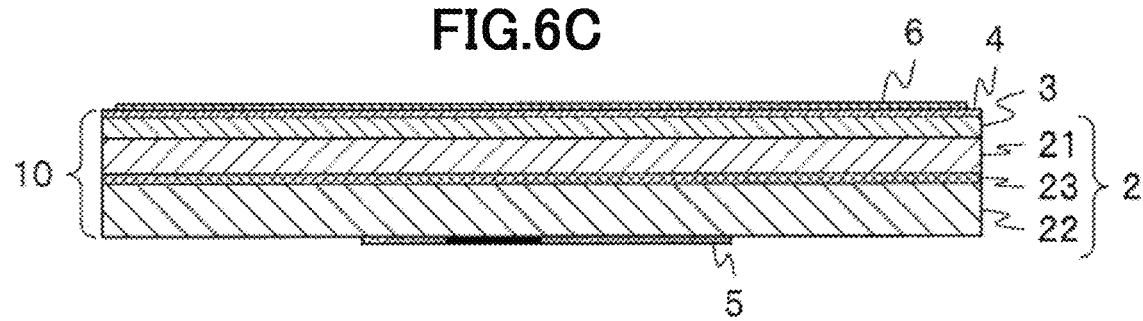
FIG. 6C is a schematic view (cross-sectional view) for explaining a photothermal conversion layer printing step and an image printing step in the production method for the three-dimensionally shaped object according to Embodiment 1 of the present disclosure.

As illustrated in FIG. 6C, in the production of the 2.5D image 1, the photothermal conversion layer 5 is formed as a black pattern on the back side of the thermally expandable sheet 10 except for in the region where the thickness of the 2.5D image 1 is the smallest (the thickness $t_0$ region illustrated in FIG. 2B). After the unevennesses have been formed in the front side of the thermally expansive layer 3, the photothermal conversion layer 5 is removed from the thermally expandable sheet 10 together with the second base 22 of the base 2. Accordingly, the photothermal conversion layer 5 is not present in the 2.5D image 1. The photothermal conversion layer 5 is a layer that absorbs light of a specific wavelength region such as near infrared light (wavelength: 780 nm to 2.5 μm), converts the absorbed light to heat, and releases the converted heat. Specifically, the photothermal conversion layer 5 is made from, for example, typical carbon black-containing black (K) ink used for printing. The temperature of the photothermal conversion layer 5 reached due to the released heat depends on the gradation, that is, the density of the carbon black. The thermally expansive layer 3 distends in accordance with the temperature of the photothermal conversion layer 5 and forms the unevennesses in the front side. Accordingly, the photothermal conversion layer 5 is printed by gray scale printing and, when viewed from the front side, is printed at higher densities in regions where higher convexities are to be formed. Moreover, the pattern of the photothermal conversion layer 5 is printed on the back side of the thermally expandable sheet 10 and, as such, is a mirror image of the unevenness pattern of the 2.5D image 1. Note that the photothermal conversion layer 5 is not limited to absorbing light and may absorb electromagnetic waves containing radio waves, convert the absorbed electromagnetic waves to heat, and release the converted heat. Accordingly, the photothermal conversion layer 5 can also be described as an electromagnetic wave heat conversion layer 5. In this application, unless otherwise noted, the term "light" means near-infrared light that is converted to heat by the carbon black of the photothermal conversion layer 5.

Returning to the description of the 2.5D image 1, next, the elements of the 2.5D image 1 not included in the thermally expandable sheet 10, and the elements of the 2.5D image 1 that differ from the thermally expandable sheet 10 will be described. With the exception of the planar shape, the first base 21 is the same as the thermally expandable sheet 10. The ink receiving layer 4 conforms to the deformation of the top surface of the thermally expansive layer 3 and covers the thermally expansive layer 3.

Thermally Expansive Layer

The thermally expansive layer 3 of the 2.5D image 1 is a main element of the 2.5D image 1 and is a film in which the thickness differs by region so as to form the unevennesses on one side (the front side). In the thermally expansive layer 3 of the 2.5D image 1, the thickness of the region where the unevennesses are smallest, that is, the thinnest region, is the thickness $t_0$. The thermally expansive layer 3 has flexibility and elasticity in the 2.5D image 1 as well. As described above, in the thermally expansive layer 3 of the 2.5D image 1, flexibility and elasticity tend to be lower in the regions having greater thickness. Accordingly, when producing a decorated three-dimensional object 8, it is preferable that the unevenness shapes, the heights of the convexities, the maximum length, and the like be designed such that the 2.5D image 1 deforms in accordance with the surface shape of the article B to which the 2.5D image 1 is to be affixed.

Color Layer

The color layer 6 is made from typical cyan (C), magenta (M), and yellow (Y) printing-use color inks. The color layer 6 is formed in a desired image pattern on the front side of the 2.5D image 1, that is, on the ink receiving layer 4, by full-color printing, for example. The color layer 6 may further contain white ink. Note that black in the color layer 6 is expressed by blending the three CMY colors, and carbon black-containing black ink is not used in the color layer 6. Depending on the use of the 2.5D image 1, a pigment-based ink, for example, is used to provide the color layer 6 with water resistance.

Decorated Three-Dimensional Object

Configurations of decorated three-dimensional objects according to the embodiments of the present disclosure are described while referencing FIG. 3A and FIG. 3B. As illustrated in FIG. 3A, the article B is a wine bottle having a typical shape. The 2.5D image 1 is affixed from the spherical shoulder portion onto the cylindrical body portion of the article B. The 2.5D image 1 is used as a label for decorating the article B. Note that the size of the 2.5D image 1 is not limited to sizes that can be affixed to a portion of the surface of a small article. For example, as illustrated in FIG. 3B, the size of a 2.5D image 1C (the shaded region in the drawing) may be a size that can be affixed to the entire front side (the front sides of the seat and the backrest) of an article C, which is a backrest-seat integrated chair wherein the seat has a gentle hyperbolic paraboloidal surface.

Production Method for 2.5D Image and Decorated Three-Dimensional Object Production Device for 2.5D Image Next, a simple description is given of the devices used in the production of the thermally expandable sheet and the 2.5D image according to the present disclosure. A coating device that forms the thermally expansive layer 3, prior to distending, on the base 2 is used in the production of the thermally expandable sheet 10. Furthermore, as necessary, a known cutting machine is used to cut the thermally expandable sheet 10 to desired dimensions. A printer and a light irradiation device are also used in the production of the 2.5D image 1. The printer prints the photothermal conversion layer 5 and the color layer 6 on the thermally expandable sheet 10. The light irradiation device irradiates the thermally expandable sheet 10 with near-infrared light and causes the photothermal conversion layer 5 to release heat, thereby causing the thermally expansive layer 3 to distend.

The coating device is a device that applies coating material to the sheet-like base to form a coating film having a uniform thickness. A known device using a bar coater system, a roll coater system, a spray system, or the like can be used for the coating device. It is preferable that the coating device uses a bar coater system suitable for coating at a uniform thickness.

The printer prints the photothermal conversion layer 5 and the color layer 6. An off-set printer, an inkjet printer, or other known printer is used depending on the print quality, production model (mass production, small quantity production), and the like. Moreover, the printer satisfies specifications corresponding to the dimensions and the thickness of the object to be printed, namely the thermally expandable sheet 10. The printer prints the photothermal conversion layer 5 and the color layer 6 by a method in which the thermally expansive layer 3 is not heated to, or higher than, the expansion starting temperature of the thermally expansive layer 3 (for example, 80° or higher). The printer may be a printer that can separate the inks by use and print the photothermal conversion layer 5 and the color layer 6 by the same system. Moreover, the printing system of the printer that prints the photothermal conversion layer 5 and the printing system of the printer that prints the color layer 6 may be different from each other.

The light irradiation device is a device that irradiates the photothermal conversion layer 5 of the thermally expandable sheet 10 with light and causes the photothermal conversion layer 5 to heat the thermally expansive layer 3, thereby causing the thermally expansive layer 3 to distend. A known device for forming a conventional three-dimensionally shaped object using a conventional thermally expandable sheet can be used as the light irradiation device. The light irradiation device satisfies specifications corresponding to the thickness of the object to be irradiated, namely the 2.5D image 1. Specifically, the light irradiation device includes a transport mechanism that transports the sheet-like object to be irradiated, a light source that irradiates light including near-infrared light that is converted to heat by the photothermal conversion layer 5, a reflection plate that reflects the light irradiated from the light source, and a cooler that cools the device. In one example, the light source is a halogen lamp. The light source is provided across the entire width of the object to be irradiated. In order to efficiently irradiate the object to be irradiated with the light irradiated from the light source, the reflection plate is formed as a substantially semi-cylindrical cylindrical curved surface and has a mirror face on the inner surface. The reflection plate covers the side opposite to the side of the light source facing the object to be irradiated. The cooler is an air cooling-type fan, a water cooling-type radiator, or the like. In one example, the cooler is provided in the vicinity of the reflection plate.

Production Method for 2.5D Image

Figure 6D:
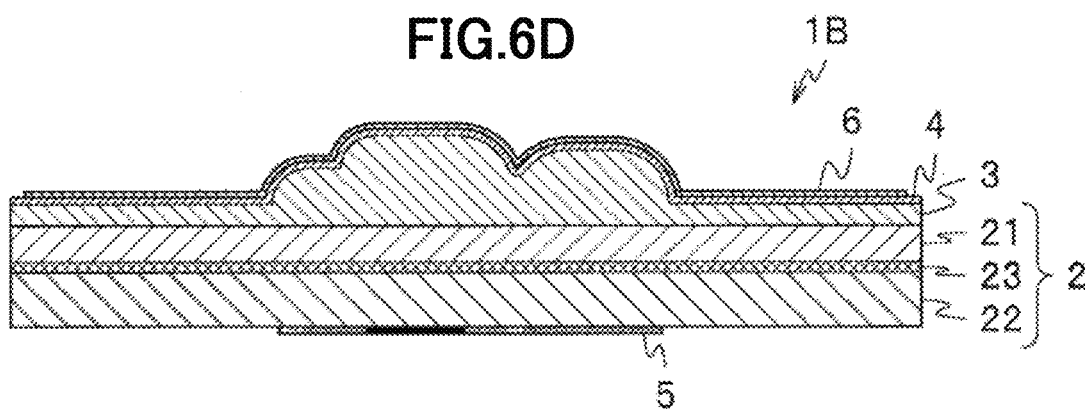
FIG. 6D is a schematic view (cross-sectional view) for explaining a light irradiation step in the production method for the three-dimensionally shaped object according to Embodiment 1 of the present disclosure.

Next, the production method for the 2.5D image 1 according to Embodiment 1 will be described while referencing FIG. 5, FIGS. 6A to 6D and, as appropriate, FIGS. 2A to 2C and FIG. 4. FIG. 5 is a flowchart illustrating the flow of the production method for the three-dimensionally shaped object 1. FIG. 6A is a schematic view (cross-sectional view) for explaining a base laminating step in the production method for the three-dimensionally shaped object 1. FIG. 6B is a schematic view (cross-sectional view) for explaining a thermally expansive layer forming step and a ink receiving layer forming step in the production method for the three-dimensionally shaped object 1. FIG. 6C is a schematic view (cross-sectional view) for explaining a photothermal conversion layer printing step and an image printing step in the production method for the three-dimensionally shaped object 1. FIG. 6D is a schematic view (cross-sectional view) for explaining a light irradiation step in the production method for the three-dimensionally shaped object 1. As illustrated in FIG. 5, in the production method for the 2.5D image 1 according to the present embodiment, a thermally expandable sheet production step S10 for producing the thermally expandable sheet 10, a photothermal conversion layer printing step S20, an image printing step S30, and a light irradiation step S40 are sequentially performed. Thereafter, a base peeling step S52 and an affixing step S53 are sequentially performed. Thus, the decorated three-dimensional object 8 is produced. As necessary, a cutting step S51 is performed prior to the affixing step S53. In the thermally expandable sheet production step S10, a base laminating step S11, a thermally expansive layer forming step S12, and an ink receiving layer forming step S13 are sequentially performed. Furthermore, as necessary, a cutting step S14 is performed.

In the base laminating step S11, as illustrated in FIG. 6A, a base paper 20 of the base 2 is produced. The base paper 20 is the base 2 prior to being cut, and, for example, is rolled paper having a size corresponding to the coating device used in the thermally expansive layer forming step S12 and the ink receiving layer forming step S13. In the base laminating step S11, the first base 21 and the second base 22 having the dimensions of the base paper 20 are bonded to each other using the adhesive layer 23.

In the thermally expansive layer forming step S12, the thermally expansive layer 3 is formed on the surface of the first base 21 side (the front side of the first base 21) of the base paper 20 (see FIG. 6B). First, a slurry is prepared by blending the thermally expandable microcapsules, a white pigment, and a thermoplastic resin solution. Next, the prepared slurry is coated on the base paper 20 by the coating device. The coated slurry is dried and, thus, a thermally expansive layer 3 having the desired thickness $t_0$ is formed. Note that multiple coatings are performed as necessary.

In the ink receiving layer forming step S13, as illustrated in FIG. 6B, the ink receiving layer 4 is formed on the thermally expansive layer 3. First, as in the thermally expansive layer forming step S12, a slurry of the ingredients of the ink receiving layer 4 is prepared. Next, the prepared slurry is coated on the thermally expansive layer 3 on the base paper 20 by the coating device. Then, the coated slurry is dried and, thus, an ink receiving layer 4 having a predetermined thickness is formed.

In the cutting step S14, the base paper 20 and the thermally expansive layer 3 and the ink receiving layer 4 formed on the base paper 20 are cut, thereby obtaining a thermally expandable sheet 10 having dimensions corresponding to the printer to be used in the photothermal conversion layer printing step S20 and the image printing step S30 (see FIG. 4).

In the photothermal conversion layer printing step S20, as illustrated in FIG. 6C, the photothermal conversion layer 5 is printed using black ink on the back side (the surface of the base 2 side) of the thermally expandable sheet 10. In the image printing step S30, as illustrated in FIG. 6C, the color layer 6 is printed using the color inks on the ink receiving layer 4 of the thermally expandable sheet 10.

In the light irradiation step S40, the surface of the thermally expandable sheet 10 on a side where the photothermal conversion layer 5 is printed (the back side of the thermally expandable sheet 10) is irradiated with the light. When the irradiated light enters and is absorbed by the photothermal conversion layer 5, the irradiated light is converted to heat. The converted heat propagates from the back side to the front side of the base 2, thereby heating the thermally expansive layer 3 to a temperature corresponding to the gradation of the photothermal conversion layer 5. Then, as illustrated in FIG. 6D, the thermally expansive layer 3 distends in accordance with the gradation of the photothermal conversion layer 5. The front side of the thermally expansive layer 3 rises due to the distension, and unevennesses are formed in the front side of the thermally expansive layer 3. While depending on the material of the thermally expansive layer 3, the temperature to which the thermally expansive layer 3 is heated is about 80° C. or higher, and is preferably distributed across a range of 100 to 120° C. in accordance with the gradation of the photothermal conversion layer 5. The output of the light source, the transport speed of the thermally expandable sheet 10, and the like are set so that light having the light quantity that converts to the heat described above enters the photothermal conversion layer 5.

In the cutting step S51, the thermally expandable sheet 10 (hereinafter referred to as "release paper-2.5D image 1B"), for which the thermally expansive layer 3 has distended as illustrated in FIG. 6D, is cut to a desired shape. For example, in the cutting step S51, the edges where the color layer 6 of the release paper-2.5D image 1B is not formed are cut off. Moreover, depending on the desired shape, the release paper-2.5D image 1B can be subjected to cutting by a cutting machine, punching, or manual processing. Depending on the cutting, the release paper-2.5D image 1B can be molded into a shape that does not fit the printer, the light irradiation device, and the like.

In the base peeling step S52, the second base 22 is peeled from the release paper-2.5D image 1B and, as a result, the 2.5D image 1 illustrated in FIG. 2A and FIG. 2B is obtained.

In the affixing step S53, the 2.5D image 1 is affixed to the surface of the desired article by the adhesive layer 23 on the back side. As a result, the decorated three-dimensional object 8 illustrated in FIG. 3A, for example, is obtained. The 2.5D image 1 has elasticity and, as such, the 2.5D image 1 can be affixed to the article B without slack, tears, or the like by stretching and affixing the 2.5D image 1 to the article B so as to follow the shape of the surface of the article B. The 2.5D image 1 can be affixed to the article B such that air bubbles are not trapped between the 2.5D image 1 and the article B. For example, the 2.5D image 1 can be affixed to the article C illustrated in FIG. 3B by a method for affixing a decorative sheet to an article in leather upholstering.

Modified Examples

The cutting step S14 may be performed in each of steps S20, S30, and S40 in order to make the dimensions of the thermally expandable sheet 10 correspond to the devices (the printer, the light irradiation device, and the like) used in each of steps S20, S30, and S40. Moreover, the cutting step S14 may be performed multiple times. The order in which the photothermal conversion layer printing step S20 and the image printing step S30 are performed may be reversed. The cutting step S51 may be performed after the base peeling step S52 by a method for processing a member having elasticity.

The black pattern, namely the photothermal conversion layer 5, is not present in the 2.5D image 1. As such, the color of the color layer 6 exhibits a clear appearance. In the 2.5D image 1, the unevennesses are formed in accordance with the pattern of the photothermal conversion layer 5 and, as such, the unevennesses are formed in the regions where the color layer 6 is not provided. However, a configuration is possible in which the 2.5D image 1 does not include the color layer 6 and the base color of the thermally expansive layer 3 is used as the appearance color. The thermally expandable sheet 10 used in the formation of such a 2.5D image 1 need not include the ink receiving layer 4.

As illustrated in FIG. 2C, the photothermal conversion layer 5 may be printed on the front side of the thermally expandable sheet 10. When the photothermal conversion layer 5 is formed on the front side of the thermally expandable sheet 10, the heat released by the photothermal conversion layer 5 propagates to the thermally expansive layer 3 without passing through the base 2 and, as such, the thickness of the base 2 can be increased. Such a 2.5D image 1 includes a photothermal conversion layer 5 (5A) below the color layer 6 (see FIG. 2C). The configuration of such a three-dimensionally shaped object 1A is described hereinafter in Embodiment 2.

Embodiment 2: Three-Dimensionally Shaped Object

The 2.5D image (the three-dimensionally shaped object) 1 according to Embodiment 1 is affixed to the article after the second base 22 has been removed from the base 2. However, it is possible to use the 2.5D image 1 while the second base 22 is included. Hereinafter, a three-dimensionally shaped object according to Embodiment 2 of the present disclosure will be described while referencing FIGS. 2A and 2C and, as appropriate, FIG. 1 and FIGS. 3A and 3B. FIG. 2C is a cross-sectional view schematically illustrating the configuration of a three-dimensionally shaped object 1A. The same reference numerals are assigned to elements that are the same as in Embodiment 1 (see FIG. 1 to FIG. 6D), and descriptions thereof are foregone.

The 2.5D image (the three-dimensionally shaped object) 1A according to Embodiment 2 of the present disclosure is a sheet-like flexible member similar to the 2.5D image 1 according to Embodiment 1 illustrated in FIG. 1. As illustrated in FIGS. 2A and 2C, the image and the unevennesses are formed on the front side of the 2.5D image 1. The appearance of the front side of the 2.5D image 1A is the same as that of the 2.5D image 1. The decorated three-dimensional object 8 illustrated in FIG. 3A and the decorated three-dimensional object 8A illustrated in FIG. 3B can be produced by coating the adhesive on the back side of the 2.5D image 1A and affixing the 2.5D image 1A to the articles B and C. Note that the definitions of the front side and the back side of the 2.5D image 1A are the same as described for the 2.5D image 1 of Embodiment 1.

As illustrated in FIGS. 2A and 2C, the 2.5D image 1A according to the present embodiment includes a base 2A, a thermally expansive layer 3 provided on a second base 22A (described later) of the base 2A and having unevennesses on the top surface, an ink receiving layer 4 provided having a substantially uniform thickness on the entire surface of the thermally expansive layer 3, a black pattern, namely a photothermal conversion layer 5A, formed on a surface of the ink receiving layer 4, and a color layer 6 that is formed on the front side of the 2.5D image 1A to form an image. In the base 2A, a first base 21A and the second base 22A are sequentially laminated from the bottom-up. The elasticity of the first base 21A is greater than the elasticity of the second base 22A. Accordingly, the 2.5D image 1A is a structure that includes the base 2A instead of the first base 21 of the 2.5D image 1 illustrated in FIG. 2A, and an additional photothermal conversion layer 5A below the color layer 6. In this 2.5D image 1A, the photothermal conversion layer 5A that releases heat is formed on the thin ink receiving layer 4 and, as such, the heat released from the photothermal conversion layer 5A easily propagates to the thermally expansive layer 3. Accordingly, the gradation of the black ink of the photothermal conversion layer 5A is easily reflected in the size to which the thermally expansive layer 3 distends. As a result, the 2.5D image 1A is clearer and can be provided with finer unevennesses.

Embodiment 2: Thermally Expandable Sheet

Figure 7A:
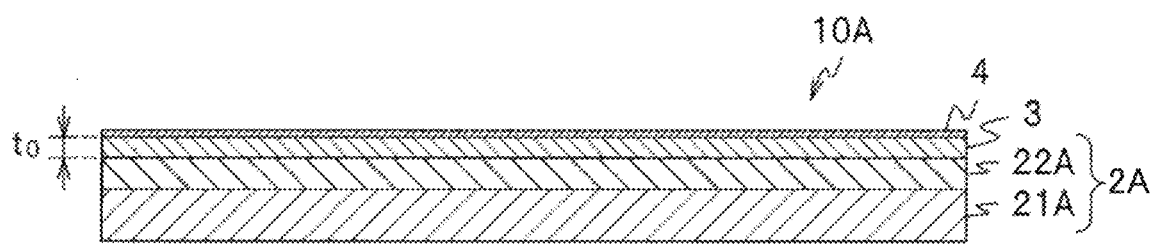
FIG. 7A is a cross-sectional view schematically illustrating the configuration of a three-dimensionally shaped object forming sheet according to Embodiment 2 of the present disclosure.

The configuration of the thermally expandable sheet 10A used in the formation of the 2.5D image 1A is described below while referencing FIG. 7A. FIG. 7A is a cross-sectional view schematically illustrating the configuration of the three-dimensionally shaped object forming sheet (the thermally expandable sheet) 10A according to Embodiment 2 of the present disclosure. As illustrated in FIG. 7A, the thermally expandable sheet 10A according to the present embodiment includes the base 2A obtained by laminating the second base 22A on the first base 21A, the thermally expansive layer 3 provided having a uniform thickness on the entire surface of the second base 22A side of the base 2A, and the ink receiving layer 4 provided having a uniform thickness on the entire surface of the thermally expansive layer 3. The thermally expandable sheet 10A is an object to be printed in which black ink of the photothermal conversion layer 5 and color inks of the color layer 6 are printed on the front side (top surface). As with the thermally expandable sheet 10 of Embodiment 1, it is sufficient that the size of the thermally expandable sheet 10A is greater than or equal to the size of the 2.5D image 1A. Moreover, it is sufficient that the size of the thermally expandable sheet 10A corresponds to the printer used to form the photothermal conversion layer 5A and the color layer 6 of the 2.5D image 1A. In the following, the surface of the second base 22A on which the thermally expansive layer 3 is provided is referred to as the "front side" of the second base 22A, and the surface of the side opposite the front side of the second base 22A is referred to as the "back side" of the second base 22A. The surface of the first base 21A facing the second base 22A side is referred to as the "front side" of the first base 21A, and the surface of the side opposite the front side of the first base 21A is referred to as the "back side" of the first base 21A. Note that, in some cases, the front side of the second base 22A is referred to as the front side of the base 2A, and the back side of the first base 21A is referred to as the back side of the base 2A. The definitions of the front sides and the back sides of the thermally expansive layer 3 and the ink receiving layer 4 are the same as described for the thermally expansive layer 3 and the ink receiving layer 4 of Embodiment 1.

The base 2A has a laminated structure obtained by laminating the second base 22A, on which the thermally expansive layer 3 is provided, on the first base 21A. The elasticity of the first base 21A is greater than the elasticity of the second base 22A. In the base 2A, contrary to the base 2 of Embodiment 1, the thermally expansive layer 3 is provided on the second base 22A that has low elasticity. Moreover, for the base 2A, it is sufficient that the first base 21A and the second base 22A closely contact each other and there is no need for the first base 21A and the second base 22A to be peelable off each other. Additionally, the base 2A need not propagate the heat released from the photothermal conversion layer 5. Accordingly, the thickness of the base 2A can be increased to the extent that the printer, the light irradiation device, and the like used in the production of the thermally expandable sheet 10A and the 2.5D image 1A can handle. The base 2A has flexibility and elasticity in ranges adaptable to the coating device, the printer, and the like. Moreover, as with the base 2 of Embodiment 1, the base 2A has strength (rigidity) corresponding to the production of the thermally expandable sheet 10A and the 2.5D image 1A. Accordingly, the thermally expandable sheet 10A including the base 2A can be provided with elasticity and the necessary strength throughout the entire thermally expandable sheet 10. The strength of the thermally expandable sheet 10A can be increased by, for example, increasing the thickness of the base 2A.

It is preferable that the first base 21A and the second base 22A have durability greater than or equal to that of the thermally expansive layer 3. Additionally, depending on the use of the 2.5D image 1A, the first base 21A and the second base 22A have water resistance. The back side of the first base 21A that has high elasticity corresponds to the back side of the 2.5D image 1A to be affixed to an article and, as such, the first base 21A can facilitate the affixing of the 2.5D image 1A. As with the first base 21 of Embodiment 1, it is preferable that the first base 21A can stretch together with the thermally expansive layer 3 due to external forces. Furthermore, it is preferable that the first base 21A can stretch and contract together with the thermally expansive layer 3. In cases where it is difficult to obtain the strength (rigidity) necessary to produce the 2.5D image 1A from the second base 22A alone, the first base 21A is also designed to have a certain degree of strength. As with the first base 21 of Embodiment 1, the first base 21A is a resin film. The first base 21A is formed from the same resin used to form the first base 21. Additionally, the first base 21A is formed having a thickness whereby the required strength, coefficient of extension, and the like can be obtained.

The second base 22A functions as a core that is sandwiched between the first base 21A and the thermally expansive layer 3 in the thermally expandable sheet 10A and the 2.5D image 1A. The second base 22A reinforces the thermally expansive layer 3. The elasticity of the second base 22A is less than the elasticity of the first base 21A. Additionally, the elasticity of the second base 22A is less than the elasticity of the thermally expansive layer 3 prior to distending. It is preferable that the second base 22A can stretch due to external forces of a certain degree or greater. In one example, the coefficient of extension of the second base 22A is configured such that the thermally expandable sheet 10A does not deform when the thermally expandable sheet 10A is transported by the transport mechanisms of the printer and the light irradiation device. Additionally, the front side of the second base 22A has high adhesiveness to the thermally expansive layer 3. The second base 22A is a resin film having a certain coefficient of extension that is less than that of the first base 21A. The second base 22A is formed from the same resin used to form the first base 21 and is formed such that the desired mechanical characteristics are obtained. Additionally, the thickness of the second base 22A is preferably a thickness whereby the 2.5D image 1A can be easily deformed and the whereby the necessary strength can be obtained together with the first base 21A. It is preferable that the thickness of the second base 22A is less than the thickness of the first base 21A.

The thermally expansive layer 3 and the ink receiving layer 4 of the thermally expandable sheet 10A are the same as the thermally expansive layer 3 and the ink receiving layer 4 of the thermally expandable sheet 10 of Embodiment 1. Next, returning to the configuration of the 2.5D image 1A, the elements of the thermally expandable sheet 10A not included in the thermally expandable sheet 10A, and the elements of the thermally expandable sheet 10A that differ from the thermally expandable sheet 10 will be described. With the exception of the planar shape, the base 2A is the same as the thermally expandable sheet 10A. The thermally expansive layer 3, the ink receiving layer 4, and the color layer 6 are the same as the thermally expansive layer 3, the ink receiving layer 4, and the color layer 6 of the 2.5D image 1 of Embodiment 1.

Photothermal Conversion Layer

As with the photothermal conversion layer 5 of Embodiment 1, the photothermal conversion layer 5A is a layer that absorbs light, converts the absorbed light to heat, and releases the converted heat. As with the photothermal conversion layer 5 of Embodiment 1, the photothermal conversion layer 5A is formed from black ink. The pattern of the photothermal conversion layer 5 in Embodiment 1 is a mirror image of the unevenness pattern of the 2.5D image 1, but the pattern of the photothermal conversion layer 5A formed on the ink receiving layer 4 is a normal image of the unevenness pattern of the 2.5D image 1A. Moreover, as described above, since the converted heat will easily propagate to the thermally expansive layer 3, the density of the carbon black in the black ink of the photothermal conversion layer 5A can be set lower than the density of the carbon black in the black ink of the photothermal conversion layer 5 in Embodiment 1. Accordingly, the phenomenon in which the black pattern of the photothermal conversion layer 5A is visible through the color layer 6 covering the photothermal conversion layer 5A can be suppressed.

Figure 7B:
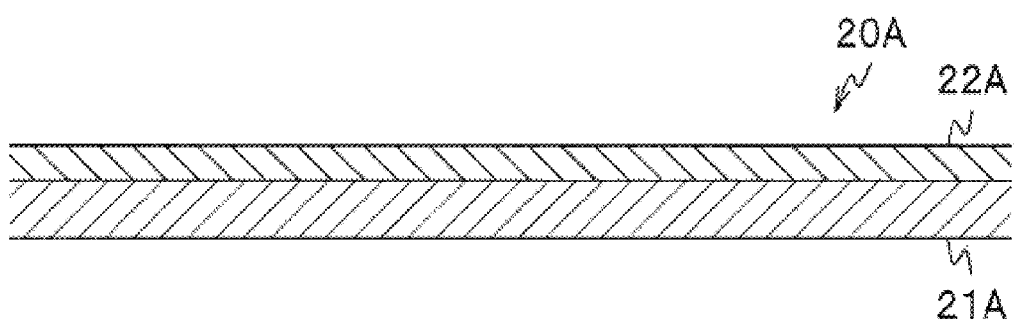
FIG. 7B is a schematic view (cross-sectional view) for explaining a base laminating step in the production method for the three-dimensionally shaped object according to Embodiment 2 of the present disclosure.
Figure 7C:
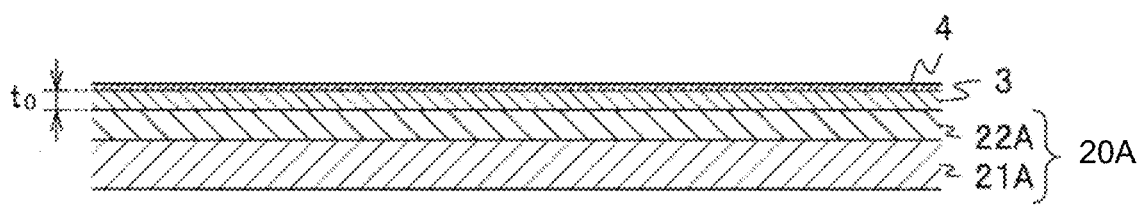
FIG. 7C is a schematic view (cross-sectional view) for explaining a thermally expansive layer forming step and an ink receiving layer forming step in the production method for the three-dimensionally shaped object according to Embodiment 2 of the present disclosure.
Figure 7D:
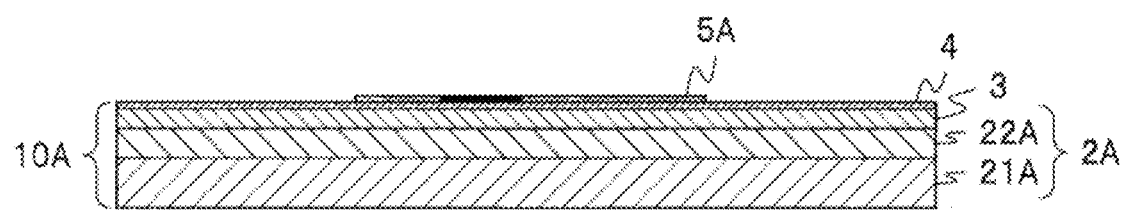
FIG. 7D is a schematic view (cross-sectional view) for explaining a photothermal conversion layer printing step in the production method for the three-dimensionally shaped object according to Embodiment 2 of the present disclosure.
Figure 7E:
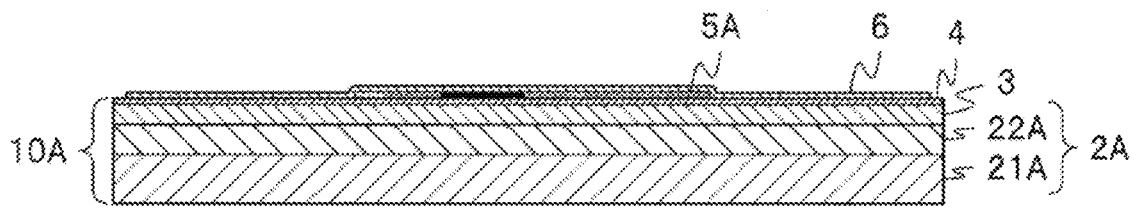
FIG. 7E is a schematic view (cross-sectional view) for explaining an image printing step in the production method for the three-dimensionally shaped object according to Embodiment 2 of the present disclosure.

Production Method for 2.5D Image and Decorated Three-Dimensional Object Production Method for 2.5D Image The production method for the 2.5D image 1A according to Embodiment 2 will be described while referencing FIG. 5, FIGS. 7B to 7E and, as appropriate, FIGS. 2A and 2C. FIG. 7B is a schematic view (cross-sectional view) for explaining the base laminating step in the production method for the three-dimensionally shaped object 1A. FIG. 7C is a schematic view (cross-sectional view) for explaining the thermally expansive layer forming step and the ink receiving layer forming step in the production method for the three-dimensionally shaped object 1A. FIG. 7D is a schematic view (cross-sectional view) for explaining the photothermal conversion layer printing step in the production method for the three-dimensionally shaped object 1A. FIG. 7E is a schematic view (cross-sectional view) for explaining the image printing step in the production method for the three-dimensionally shaped object 1A. The devices used in the production of the 2.5D image 1A according to the present embodiment are the same as the devices used in Embodiment 1. As illustrated in FIG. 5, in the production method for the 2.5D image 1A according to the present embodiment, as in Embodiment 1, the thermally expandable sheet production step S10, the photothermal conversion layer printing step S20, the image printing step S30, and the light irradiation step S40 are sequentially performed. Thereafter, as necessary, the cutting step S51 is performed, and then the affixing step S53 is performed. Note that, different from Embodiment 1, the base peeling step S52 is not performed. As in Embodiment 1, in the thermally expandable sheet production step S10, the base laminating step S11, the thermally expansive layer forming step S12, and the ink receiving layer forming step S13 are sequentially performed.

Thereafter, as necessary, the cutting step S14 is performed. Next, detailed descriptions are given of the various steps for producing the 2.5D image 1A according to Embodiment 2, particularly the steps that differ from the steps for producing the 2.5D image 1 according to Embodiment 1.

In the base laminating step S11, as illustrated in FIG. 7B, a base paper 20A of the base 2A is produced. The base paper 20A is the base 2A prior to being cut, and, for example, is rolled paper of a size corresponding to the coating device used in the successive thermally expansive layer forming step S12 and ink receiving layer forming step S13. In the base laminating step S11, the first base 21A and the second base 22A having the dimensions of the base paper 20A are bonded to each other by thermo-compression bonding.

In the thermally expansive layer forming step S12 and the ink receiving layer forming step S13, as illustrated in FIG. 7C, the thermally expansive layer 3 and the ink receiving layer 4 are successively formed on the surface of the second base 22A side of the base paper 20A (the front side of the second base 22A). Next, in the cutting step S14, the base paper 20A on which the thermally expansive layer 3 and the ink receiving layer 4 are formed is cut. Thus, the thermally expandable sheet 10A is obtained (see FIG. 7A). These steps S12, S13, and S14 are the same as the steps S12, S13, and S14 of Embodiment 1.

In the photothermal conversion layer printing step S20, as illustrated in FIG. 7D, the photothermal conversion layer 5A is printed using the black ink on the ink receiving layer 4 provided on the front side of the thermally expandable sheet 10. Next, in the image printing step S30, as illustrated in FIG. 7E, the color layer 6 is printed using the color inks on the ink receiving layer 4 and on the photothermal conversion layer 5A provided on the front side of the thermally expandable sheet 10A.

In the light irradiation step S40, the surface of the side of the thermally expandable sheet 10A on which the photothermal conversion layer 5A is printed is irradiated with light. Aside from the surface that is irradiated with light, the light irradiation step S40 of the present embodiment is the same as the light irradiation step S40 of Embodiment 1. As a result of being irradiated with the light, the thermally expansive layer 3 is heated to a temperature corresponding to the gradation of the photothermal conversion layer 5A. Then, as illustrated in FIG. 2C, the front side of the thermally expansive layer 3 rises and the unevennesses are formed in the front side of the thermally expansive layer 3. Next, as in Embodiment 1, the cutting step S51 is performed and, thus, the 2.5D image 1A illustrated in FIGS. 2A and 2C is obtained.

In the affixing step S53, an adhesive is coated on one or both of the back side of the 2.5D image 1A (the back side of the first base 21A) and the region of the surface of the article B where the 2.5D image 1A is to be affixed. Then, the 2.5D image 1A is affixed to the article B and, thus, the decorated three-dimensional object 8 illustrated in FIG. 3 is obtained. The adhesive is a known adhesive that corresponds to the materials of the article B and the first base 21A, and has adhesive strength, water resistance, and other characteristics that correspond to the use of the article B. The elasticity of the second base 22A positioned between the first base 21A and the thermally expansive layer 3 is lower than the elasticities of the first base 21A and the thermally expansive layer 3. As such, it is preferable that the 2.5D image 1A is deformed, with the second base 22A as the core (axis), along the surface shape of the article B such that one of the thermally expansive layer 3 and the first base 21A stretches and the other contracts. Moreover, as with the 2.5D image 1 of Embodiment 1, the 2.5D image 1A can also be affixed to an article C such as that illustrated in FIG. 3B.

Modified Examples

In the 2.5D image 1A, a concealing layer (not illustrated in the drawings) may be formed between the photothermal conversion layer 5A and the color layer 6 using white ink or the like. Alternatively, the concealing layer may be provided on the photothermal conversion layer 5A. Moreover, the concealing layer may be provided below the color layer 6. Further yet, the concealing layer may be provided on the entire surface of the 2.5D image 1A, on the photothermal conversion layer 5A and on the thermally expansive layer 3. The black photothermal conversion layer 5 is concealed by the concealing layer. As a result, the color layer 6 exhibits a clearer appearance. Particularly, when the color layer 6 exhibits pale color, it is preferable that the concealing layer be provided in the 2.5D image 1. The concealing layer is provided by printing using white ink or the like after the photothermal conversion layer printing step S20 but before the image printing step S30.

The elasticity of the thermally expandable sheet 10A (particularly the base 2A) described above is suppressed so that the thermally expandable sheet 10 has strength (rigidity) corresponding to the transport mechanisms of the devices used in the production of the 2.5D image 1A. Increasing the elasticity of the thermally expandable sheet 10A makes it possible to obtain a 2.5D image 1A that can be easily affixed to an article having a curved surface with high curvature. Such a thermally expandable sheet 10A is produced by an apparatus wherein the printer, the light irradiation device, and the like do not include transport mechanisms for the object to the processed (the thermally expandable sheet 10A). For example, a printer, such as a screen printer, is used in which the object to be processed is fixed to a mounting stand and then the object to be processed is printed on. In such a printer, the object to be processed can be moved while fixed to the mounting stand. Moreover, the printer may print on the object to be processed by moving the print head without moving the mounting stand to which the object to be processed is fixed. In one example, the thermally expandable sheet 10A is fixed to the mounting stand by the edges of two or four opposing edges of the thermally expandable sheet 10. It is sufficient that the thermally expandable sheet 10A is fixed such that the center portion thereof does not lift from the mounting stand. For example, the thermally expandable sheet 10A may be fixed by an electrostatic adsorption mechanism provided in the mounting stand of the light irradiation device.

As described above, according to the present disclosure, a three-dimensionally shaped object having flexibility and elasticity and that can be affixed to a curved surface of a desired shape can be easily obtained. According to the present disclosure, it is possible to produce an article having a macroscopic three-dimensional shape (for example, a macroscopic undulating surface) as a member to be decorated, separately produce a sheet-like three-dimensionally shaped object having microscopic surface unevennesses as a decorative member, and affix the sheet-like three-dimensionally shaped object as the decorative member to the article as the member to be decorated. As a result, fine decorations can be easily applied to large articles. The decorative members, namely the 2.5D images 1 and 1A, are produced from the thermally expandable sheets 10 and 10A that include thermally expansive layers. The unevennesses of the 2.5D images 1 and 1A (that is, the microscopic surface unevennesses functioning as decoration) are formed by the photothermal conversion layer (electromagnetic wave heat conversion layer) 5 being irradiated with light (electromagnetic waves) of a predetermined wavelength. Therefore, according to the present disclosure, microscopic surface unevennesses can be collectively formed with high precision in a wide region. Additionally, according to the present disclosure, the production throughput of the decorative members (the 2.5D images 1 and 1A) can be improved. Furthermore, the elasticity of the decorative members (the 2.5D images 1 and 1A) is high and, as such, the decorative members can be affixed so as to follow the surfaces of articles having macroscopically three-dimensional shapes.

The uses of the three-dimensionally shaped objects (the 2.5D images) 1 and 1A are not limited to decorative members. Since the distended portion of the thermally expansive layer 3 has elasticity, the three-dimensionally shaped objects 1 and 1A can be used as sheet-like cushioning materials such as foamed sheets, air cushions, and the like. Moreover, a 2.5D image 1 (1A) that exhibits predetermined shapes, characters, and the like using the unevennesses and that is colored by the color layer 6 can be used as both a cushioning material and as packaging material such as packaging paper. Additionally, the thermally expansive layer 3 melts when heated to the temperature at which the microcapsules distend or higher. As such, the 2.5D images 1 and 1A can stacked and thermo-compressed to be formed into a bag shape or the like and used. Furthermore, the three-dimensionally shaped objects 1 and 1A are easily formed into a desired uneven shapes and, as such, can be used as a cushioning material of an electronic circuit board having fine, complex unevennesses. With the three-dimensionally shaped objects 1 and 1A used as the cushioning material of an electronic circuit board, the unevennesses are formed for each model number of electronic circuit board, corresponding to the sizes and the positions of the electronic components mounted on the board, so as to fit together with the electronic components. Note that both the 2.5D image 1 that does not include the photothermal conversion layer 5A (see FIG. 2B) and the 2.5D image 1A that does include the photothermal conversion layer 5A (see FIG. 2C) can be used as a cushioning material of an electronic circuit board. When the 2.5D image 1A that includes the photothermal conversion layer 5A is used as a cushioning material of an electronic circuit board, the 2.5D image 1A may be imparted with electrical conductivity by the carbon black contained in the black ink. Moreover, a configuration is possible in which the color layer 6 is not formed in the three-dimensionally shaped objects 1 and 1A used as cushioning materials. The model number of the electronic circuit board to be protected, alignment markers for the electronic circuit board, and the like may be printed by the color layer 6 on the three-dimensionally shaped objects 1 and 1A used as cushioning materials. Moreover, since the distended thermally expansive layer 3 functions as a heat insulating material, the three-dimensionally shaped objects 1 and 1A can be attached to walls, windows and other building materials and used as heat insulating material. The three-dimensionally shaped objects 1 and 1A used as heat insulating material can easily be attached to construction materials without gaps by, for example, forming unevennesses that match the steps of a window frame. The three-dimensionally shaped objects 1 and 1A can be used both as heat insulation material and as decoration such as wall paper. For example, the three-dimensionally shaped objects 1 and 1A form wood grain, tile-like, or similar patterns depending on the combination of the unevennesses and the color layer 6.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A production method for a three-dimensionally shaped object, comprising:
    a step of producing a sheet by providing a thermally expansive layer on a main surface of a base on a side of a first base, the base including the first base and a second base that are laminated thereon;
    a step of providing an electromagnetic wave heat conversion layer on a main surface of the base of the sheet on a side of the second base; and
    an unevenness forming step of forming unevennesses on a surface of the sheet by causing the thermally expansive layer of a region corresponding to the electromagnetic wave heat conversion layer to distend by irradiating the electromagnetic wave heat conversion layer with electromagnetic waves of a predetermined wavelength,
    wherein the first base and the second base have elasticities different from each other.

2. The production method for a three-dimensionally shaped object according to claim 1,
    wherein an elasticity of the first base is greater than an elasticity of the second base; and
    wherein the first base is a resin film comprising a polyethylene resin, a polypropylene resin, a polyvinyl alcohol resin, a polyvinyl chloride resin, or a polyurethane resin.

3. A production method for a three-dimensionally shaped object having unevennesses in a surface, the production method comprising sequentially performing:
    a base laminating step of producing a base by laminating together a second base and a first base having a greater elasticity than an elasticity of the second base;
    a thermally expansive layer forming step of forming, on a main surface of the base on a side of the first base, a thermally expansive layer that distends at a predetermined temperature or higher;
    a photothermal conversion layer printing step of printing a photothermal conversion layer for converting absorbed light to heat and releasing the heat on a main surface of the base on a side of the second base; and
    a light irradiation step of irradiating light so as to reach the photothermal conversion layer thereby causing the thermally expansive layer in a region where the photothermal conversion layer is formed to distend.

4. A production method for a decorated three-dimensional object having unevennesses in at least a portion of a surface, the production method comprising sequentially performing:
    a base laminating step for producing a base by laminating a second base and a first base having a greater elasticity than an elasticity of the second base;
    a thermally expansive layer forming step of forming, on a main surface of the base on a side of the first base, a thermally expansive layer that distends at a predetermined temperature or higher;

a photothermal conversion layer printing step of printing a photothermal conversion layer for converting absorbed light to heat and releasing the heat on a main surface of the base on a side of the second base;

a light irradiation step of irradiating light from the side of the second base of the base so as to reach the photothermal conversion layer thereby causing the thermally expansive layer in a region where the photothermal conversion layer is formed to distend; and an affixing step of affixing the base to a surface of an article.

5. The production method for a decorated three-dimensional object according to claim 4, wherein prior to the affixing step, a base peeling step of peeling and removing the second base from the first base is performed, and wherein, in the affixing step, the first base is affixed to the surface of the article.

6. The production method for a decorated three-dimensional object according to claim 5, wherein the first base is a resin film comprising a polyethylene resin, a polypropylene resin, a polyvinyl alcohol resin, a polyvinyl chloride resin, or a polyurethane resin.

7. The production method for a three-dimensionally shaped object according to claim 1, wherein a thickness of the second base in a direction from a first side facing the first base toward a second side opposite to the first side is selected to transmit the heat emitted by the electromagnetic wave heat conversion layer from the second side of the second base to the thermally expansive layer to cause the thermally expansive layer to distend at the predetermined temperature or higher, and wherein the second base is configured to be peelable from first base.

* * * * *